(12) United States Patent
Xykis et al.

(10) Patent No.: US 11,143,093 B2
(45) Date of Patent: Oct. 12, 2021

(54) FLUID-COOLED MANIFOLDS AND ENGINE SYSTEMS

(71) Applicant: Power Solutions International, Inc., Wood Dale, IL (US)

(72) Inventors: Constantine Xykis, Hartland, WI (US); Mark Damico, Island Lake, IL (US); Dan Kasper, Berkeley, IL (US); Patrick Stockwell, Wauwatosa, WI (US); Joshua Horner, Naperville, IL (US)

(73) Assignee: Power Solutions International, Inc., Wood Dale, IL (US)

( * ) Notice: Subject to any disclaimer, the term of this patent is extended or adjusted under 35 U.S.C. 154(b) by 0 days.

(21) Appl. No.: 16/855,990

(22) Filed: Apr. 22, 2020

(65) Prior Publication Data

US 2021/0207525 A1    Jul. 8, 2021

Related U.S. Application Data

(60) Provisional application No. 62/957,681, filed on Jan. 6, 2020.

(51) Int. Cl.
| | |
|---|---|
| *F02B 29/04* | (2006.01) |
| *F02B 37/00* | (2006.01) |
| *F01N 3/04* | (2006.01) |

(52) U.S. Cl.
CPC .......... *F02B 29/0443* (2013.01); *F01N 3/046* (2013.01); *F02B 29/0462* (2013.01); *F02B 37/00* (2013.01)

(58) Field of Classification Search
CPC .. F02B 29/0443; F02B 37/00; F02B 29/0462; F01N 3/046
See application file for complete search history.

(56) References Cited

U.S. PATENT DOCUMENTS

| 6,397,589 B1 | 6/2002 | Beson et al. |
| 8,650,864 B2 | 2/2014 | Waggoner et al. |

(Continued)

FOREIGN PATENT DOCUMENTS

| JP | 2005-214029 A | 8/2005 |
| KR | 10-2000-0033681 A | 6/2000 |

OTHER PUBLICATIONS

International Search Report and Written Opinion prepared by the Korean Patent Office in International Application No. PCT/US2021/012125 dated May 28, 2021.

*Primary Examiner* — Audrey B. Walter
*Assistant Examiner* — Edward Bushard
(74) *Attorney, Agent, or Firm* — McDonnell Boehnen Hulbert & Berghoff LLP

(57) ABSTRACT

A fluid-cooled manifold is configured to cool exhaust from an engine. The fluid-cooled manifold includes a plurality of exhaust runners. Each of the exhaust runners includes a runner body having an inlet end and an outlet end, an exhaust conduit extending through the runner body, and a coolant passage extending through the runner body. The fluid-cooled manifold also includes an exhaust collection manifold including a plurality of inlets. Each inlet of the exhaust collection manifold is coupled to the exhaust outlet opening of a respective one of the exhaust runners. The fluid-cooled manifold also includes a coolant feed pipe and a coolant exit pipe. The coolant feed pipe includes a plurality of outlets coupled to the coolant inlets of the exhaust runners. Likewise, the coolant exit pipe includes a plurality of inlets coupled to the coolant outlets of the exhaust runners.

15 Claims, 8 Drawing Sheets

(56) References Cited

U.S. PATENT DOCUMENTS 9,695,721 B2     7/2017   Maloney et al.
10,934,911 B2 *   3/2021   Byrd .................... F01N 13/102

* cited by examiner

FLUID-COOLED MANIFOLDS AND ENGINE SYSTEMS

CROSS REFERENCE TO RELATED APPLICATION

The present application claims priority to U.S. Provisional Application No. 62/957,681, filed Jan. 6, 2020, entitled "Fluid-Cooled Manifolds and Engine Systems." The entire disclosure contents of U.S. Provisional Application No. 62/957,681 are herewith incorporated by reference into the present application.

BACKGROUND

As an internal combustion engine is operated, the exhaust typically leaves the engine at an elevated temperature. Rather than simply emit the exhaust into the atmosphere and allow the energy to go to waste, there are various ways in which the energy in the exhaust can be captured and utilized. For example, a turbocharger can be driven by the exhaust in order to pressurize intake air into the engine. With the pressurized intake air, additional fuel can also be added to the engine in order to produce more power.

As the power output of the engine increases, the exhaust temperature will typically also increase. While increases in the temperature of the exhaust represent additional energy that might be recaptured, higher temperatures may approach or exceed the operating limits of the materials of the exhaust components or of the turbocharger. Thus, the turbocharger cannot be operated where the exhaust temperature exceeds an operating threshold, which puts a limit on the overall power output of the engine.

Unless otherwise indicated herein, the description provided in this section is not prior art to the claims and is not admitted to be prior art by inclusion in this section.

SUMMARY

The present disclosure describes implementations that relate to a fluid-cooled manifold. Beneficially, embodiments described herein may provide the ability to increase the power output of an engine without damaging exhaust components of the engine or a turbocharger associated with the engine.

In a first aspect, the present disclosure describes a fluid-cooled manifold for cooling exhaust from an engine. The fluid-cooled manifold includes a plurality of exhaust runners including a first exhaust runner and a second exhaust runner, where the first exhaust runner is detached from the second exhaust runner. Each of the plurality of exhaust runners includes a runner body having an inlet end and an outlet end, an exhaust conduit extending through the runner body from an exhaust inlet opening at the inlet end of the runner body to an exhaust outlet opening at the outlet end of the runner body, and a coolant passage extending through the runner body from a coolant inlet opening to a coolant outlet opening. The fluid-cooled manifold also includes an exhaust collection manifold including a plurality of inlets. Each inlet of the exhaust collection manifold is coupled to the exhaust outlet opening of a respective one of the plurality of exhaust runners. Further, the fluid-cooled manifold also includes a coolant feed pipe and a coolant exit pipe. The coolant feed pipe includes a plurality of outlets, where each outlet of the coolant feed pipe is coupled to the coolant inlet of a respective one of the plurality of exhaust runners. The coolant exit pipe includes a plurality of inlets, where each inlet of the coolant exit pipe is coupled to the coolant outlet of a respective one of the plurality of exhaust runners.

In an embodiment of the fluid-cooled manifold, for each exhaust runner of the plurality of exhaust runners, the coolant passage is concentrically disposed around the exhaust conduit.

In another embodiment of the fluid-cooled manifold, for each exhaust runner of the plurality of exhaust runners, the coolant passage has an annular cross section that surrounds the exhaust conduit and that extends along a majority of a length the exhaust conduit.

In another embodiment of the fluid-cooled manifold, for each exhaust runner of the plurality of exhaust runners, the coolant inlet opening is disposed at the inlet end of the exhaust runner and the coolant outlet opening is disposed at the outlet end of the exhaust runner.

In another embodiment of the fluid-cooled manifold, for each exhaust runner of the plurality of exhaust runners, the coolant inlet opening is disposed at the outlet end of the exhaust runner and the coolant outlet opening is disposed at the inlet end of the exhaust runner.

In another embodiment of the fluid-cooled manifold, the plurality of exhaust runners includes a third exhaust runner and a fourth exhaust runner.

In another embodiment of the fluid-cooled manifold, each exhaust runner of the plurality of exhaust runners is detached from the other exhaust runners of the plurality of exhaust runners.

In another embodiment of the fluid-cooled manifold, each exhaust runner of the plurality of exhaust runners has the same shape as the other exhaust runners of the plurality of exhaust runners.

In another embodiment of the fluid-cooled manifold, the coolant feed pipe and the coolant exit pipe have the same shape.

In another aspect, the disclosure describes an engine system. The engine system includes a plurality of exhaust ports including a first group of exhaust ports. The engine system also includes a first fluid-cooled manifold coupled to the engine configured to receive exhaust from the first group of exhaust ports. The first fluid-cooled manifold includes a first group of exhaust runners including a first exhaust runner and a second exhaust runner. The first exhaust runner is detached from the second exhaust runner. Each of the first group of exhaust runners includes a runner body having an inlet end and an outlet end, an exhaust conduit extending through the runner body from an exhaust inlet opening at the inlet end of the runner body to an exhaust outlet opening at the outlet end of the runner body, wherein the exhaust inlet is coupled to a respective exhaust port of the first group of exhaust ports, and a coolant passage extending through the runner body from a coolant inlet opening to a coolant outlet opening. The first fluid-cooled manifold also includes an exhaust collection manifold including a plurality of inlets. Each inlet of the exhaust collection manifold is coupled to the exhaust outlet opening of a respective one of the first group of exhaust runners. The first fluid-cooled manifold also includes a coolant feed pipe including a plurality of outlets and a coolant exit pipe including a plurality of inlets. Each outlet of the coolant feed pipe is coupled to the coolant inlet of a respective one of the first group of exhaust runners. Each inlet of the coolant exit pipe is coupled to the coolant outlet of a respective one of the first group of exhaust runners.

In an embodiment of the engine system, for each exhaust runner of the first group of exhaust runners of the first fluid-cooled manifold, the coolant passage is concentrically disposed around the exhaust passage.

In another embodiment of the engine system, for each exhaust runner of the first group of exhaust runners of the first fluid-cooled manifold, the coolant passage has an annular cross section that surrounds the exhaust passage and that extends along a majority of the exhaust passage.

In another embodiment of the engine system, the engine system further includes a turbocharger, where the first fluid-cooled manifold is coupled to the turbocharger and is configured to deliver cooled exhaust to the turbocharger.

In another embodiment of the engine system, the plurality of exhaust ports of the engine further includes a second group of exhaust ports and the engine system further includes a second fluid-cooled manifold. The second fluid-cooled manifold includes a second group of exhaust runners. Each exhaust runner of the second group of exhaust runners including an exhaust inlet coupled to a respective exhaust port of the second group of exhaust ports.

In another embodiment of the engine system, each of the exhaust runners of the first group of exhaust runners and the second group of exhaust runners has the same shape.

In another aspect, the disclosure describes a coolant circulation system for an engine. The coolant circulation system includes a pump configured to circulate coolant through the coolant circulation system. A first cooling line is in fluid communication with the pump, where the first cooling line includes engine coolant passages extending through a portion of the engine. A first junction is downstream of the first cooling line. A first cold return line extends from the first junction to the pump. A first hot return line extends from the first junction to the pump, where the first hot return line passes through a heat exchanger configured to cool the coolant in the first hot return line. A first thermostat is disposed at the first junction and configured to direct a portion of flow from the first cooling line to the first cold return line or the first hot return line based on a temperature of the coolant at the first junction. A second cooling line is in fluid communication with the pump, where the second cooling line includes manifold coolant passages extending through a first cooled exhaust manifold. A second junction is downstream of the second cooling line. A second cold return line extends from the second junction to the pump. A second hot return line extends from the second junction to the pump, where the second hot return line passes through the heat exchanger so as to cool the coolant in the second hot return line. A second thermostat is disposed at the second junction and is configured to direct a portion of flow from the second cooling line to the second cold return line or the second hot return line based on a temperature of the coolant at the second junction.

In an embodiment of the coolant circulation system, each manifold coolant passage of the first cooled exhaust manifold is an annular passage concentrically disposed around a respective exhaust passage of the first cooled exhaust manifold.

In another embodiment of the coolant circulation system, the second cooling line also includes engine coolant passages extending through a portion of the engine.

In another embodiment of the coolant circulation system, the first cooling line includes coolant passages extending through an engine head of the engine.

In another embodiment of the coolant circulation system, the manifold coolant passages extending through the first cooled exhaust manifold are part of a first portion of the second cooling line. A second portion of the second cooling line includes manifold coolant passages extending through a second cooled exhaust manifold, and the first portion of the second cooling line runs parallel to the second portion of the second cooling line.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE DRAWINGS

The accompanying drawings, which are included to provide a further understanding of the disclosure, are incorporated in and constitute a part of this specification, illustrate embodiments of the disclosure, and together with the detailed description serve to explain the principles of the disclosure. No attempt is made to show structural details of embodiments of the disclosure in more detail than may be necessary for a fundamental understanding of the embodiments of the disclosure and various ways in which it may be practiced.

DETAILED DESCRIPTION

Exemplary apparatus and systems are described herein. It should be understood that the word "exemplary" is used herein to mean "serving as an example, instance, or illustration." Any embodiment or feature described herein as "exemplary" or an "example" is not necessarily to be construed as preferred or advantageous over other embodiments or features. The exemplary embodiments described herein are not meant to be limiting. It will be readily understood that certain aspects of the disclosed apparatus and systems can be arranged and combined in a wide variety of different configurations, all of which are contemplated herein.

Figure 1:
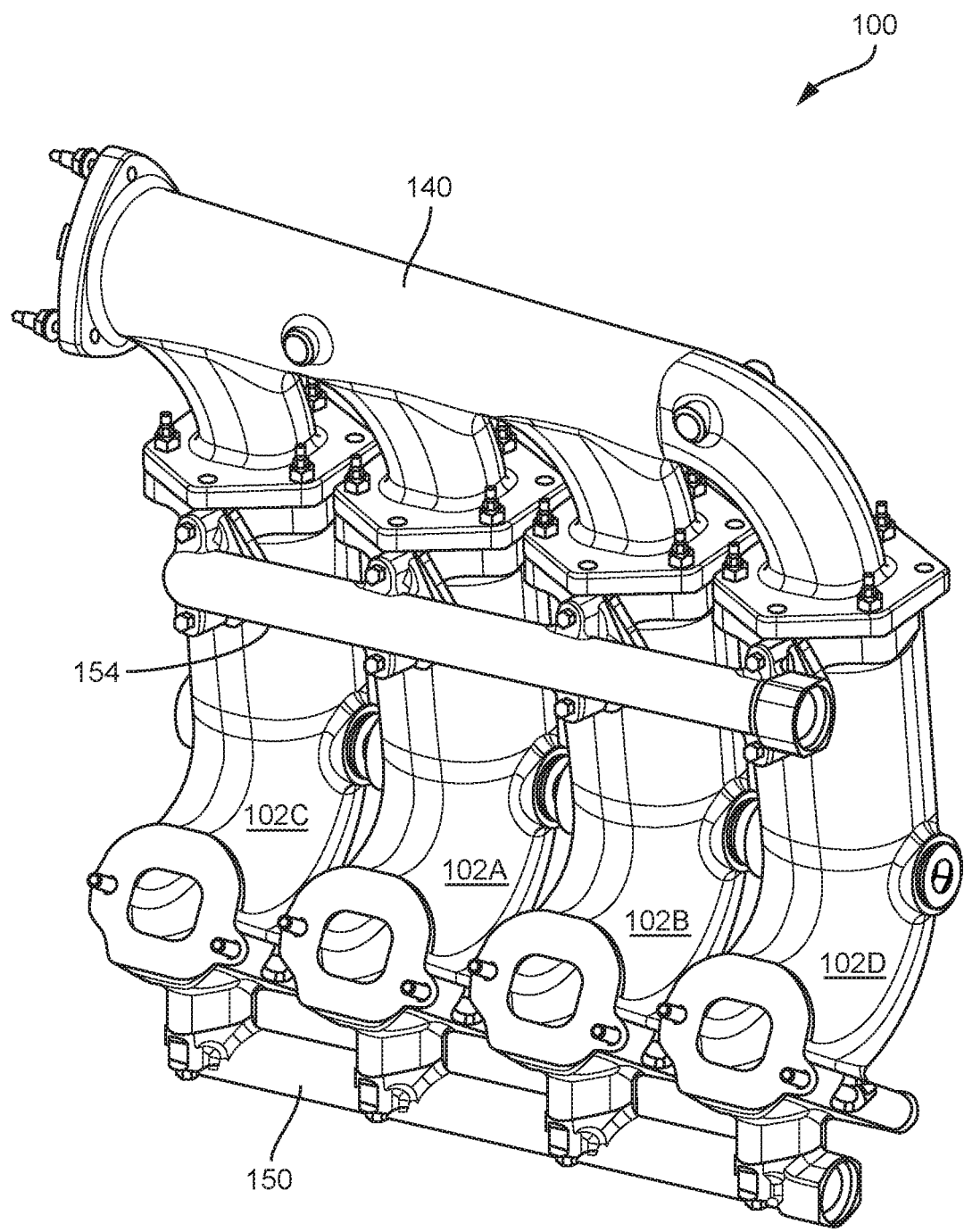
FIG. 1 is a perspective view of a fluid-cooled manifold according to an embodiment of the disclosure.
Figure 2:
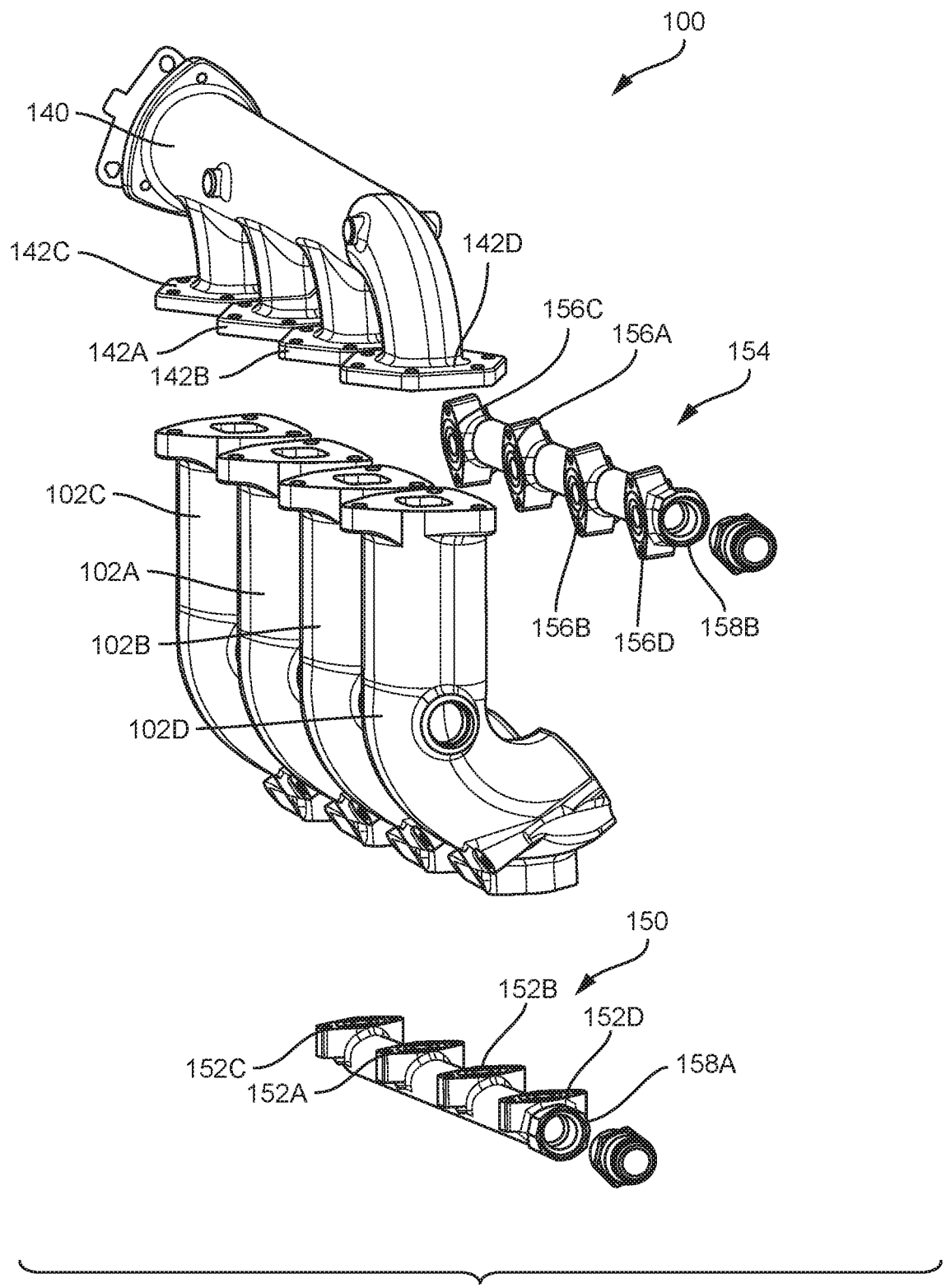
FIG. 2 is an exploded view of the fluid-cooled manifold according to FIG. 1.

FIG. 1 illustrates a fluid-cooled manifold 100 in accordance with example embodiment of the disclosure that is configured to receive and cool exhaust from an engine. An exploded view of the fluid-cooled manifold 100 is shown in FIG. 2. The fluid-cooled manifold 100 may include a plurality of exhaust runners 102A-102D, including a first exhaust runner 102A, a second exhaust runner 102B, a third exhaust runner 102C, and a fourth exhaust runner 102D. The exhaust runners 102A-102D may be disposed in a line, as shown in FIG. 1, where the first exhaust runner 102A and the second exhaust runner 102B are positioned toward the center of the fluid-cooled manifold 100, whereas the third exhaust runner 102C and the fourth exhaust runner 102D are positioned on the periphery of the fluid-cooled manifold. As discussed in more detail below, the first exhaust runner 102A and the second exhaust runner 102B may be detached from one another.

Each of the exhaust runners 102A-102D may be configured to attach to an engine in order to receive exhaust from the engine, as described in more detail below. For example, each exhaust runner 102A-102D is configured to attach an exhaust port associated with a cylinder of the engine. In some embodiments the fluid-cooled manifold is configured such that each exhaust runner 102A-102D is paired with one cylinder of the engine. In other embodiments, each of the exhaust runners may be associated with more than one cylinder of the engine. On the other hand, in other embodiments, more than one exhaust runner may be associated with a cylinder of the engine. For example, in some embodiments, two exhaust runners may be associated with each cylinder of the engine. In such embodiments, an adapter may be positioned between the fluid-cooled manifold and the exhaust ports of the engine in order to combine or divide exhaust from the exhaust ports for introduction into the fluid-cooled manifold.

The fluid-cooled manifold 100 may also include an exhaust collection manifold 140 that receives exhaust from the exhaust runners 102A-102D and directs the exhaust downstream, as explained in more detail below. The exhaust collection manifold 140 may include a plurality of inlets 142A-142D, as shown in FIG. 2, that are respectively coupled to the exhaust runners 102A-102D. Further, the fluid-cooled manifold 100 may also include a coolant feed pipe 150 and a coolant exit pipe 154. The coolant feed pipe 150 may include a plurality of outlets 152A-152D, as shown in FIG. 2, that are respectively coupled to the exhaust runners 102A-102D. Likewise, the coolant exit pipe 154 may include a plurality of inlets 156A-156D, also shown in FIG. 2, that are respectively coupled to the exhaust runners 102A-102D. The coolant feed pipe 150 and coolant exit pipe 154 may be part of a coolant circulation system that is configured to circulate a coolant through the fluid-cooled manifold, as explained in more detail below. Accordingly, the coolant feed pipe 150 may include an inlet 158A for receiving coolant that is circulated through the coolant circulation system. Further, the coolant feed pipe 150 may be configured to deliver the coolant to the exhaust runners 102A-102D through the feed pipe outlets 152A-152D. Likewise, the coolant exit pipe 154 may be configured to receive the coolant from the exhaust runners 102A-102D via the exit pipe inlets 156A-156D and include an outlet 158B to continue circulation of the coolant through the coolant circulation system.

Figure 3:
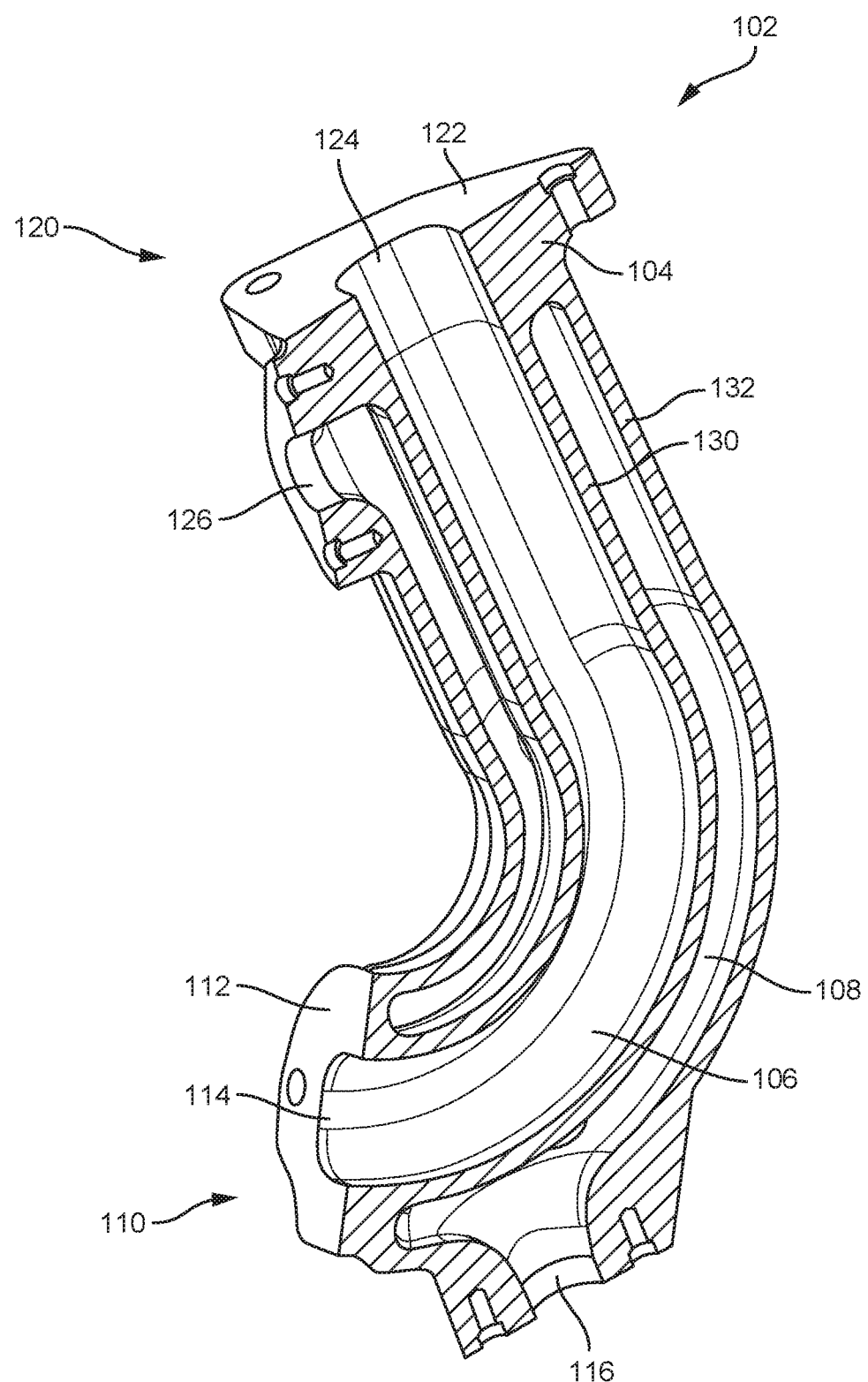
FIG. 3 is a cross-sectional view of an exhaust runner of the fluid-cooled manifold according to FIG. 1.

A side cross-sectional view of one of the exhaust runners 102 (e.g., exhaust runner 102A) of fluid-cooled manifold 100 is shown in FIG. 3. As explained in more detail below, the exhaust runners may all have a similar configuration. As shown in FIG. 3, exhaust runner 102 may include a runner body 104 having an inlet end 110 and an outlet end 120. The inlet end 110 may include a first attachment surface 112 configured to be secured against the engine so as to surround an exhaust port of the engine. Further, the inlet end 110 may also include an exhaust inlet opening 114 that provides fluid access to an exhaust conduit 106 that extends through the runner body 104. The exhaust inlet opening 114 extends through the first attachment surface 112. The outlet end 120 may include a second attachment surface 122 that is attached to a respective inlet 142A-142D of the inlets of the exhaust collection manifold 140. In various embodiments, a seal, such as a gasket, may be included between the second attachment surface 122 and the respective inlet 142A-142D of the exhaust collection manifold 140. The outlet end 120 of each exhaust runner may also include an exhaust outlet opening 124 that extends through the second attachment surface 122 and provides fluid access to the exhaust conduit 106. Thus, the exhaust conduit 106 may run through the runner body 104 from the exhaust inlet opening 114 at the inlet end 110 to the exhaust outlet opening 124 at the outlet end 120.

The exhaust runner 102 may also include a coolant passage 108 that extends through the runner body 104 from a coolant inlet opening 116 to a coolant outlet opening 126. To receive coolant from the coolant feed pipe 150, the coolant inlet opening 116 may be coupled to a respective one of the feed pipe outlets 152A-152D (as shown in FIG. 2). After passing through the exhaust runner 102 the coolant may exit the coolant passage 108 via the coolant outlet opening 126 and flow into the coolant exit pipe 154 via a respective one of the exit pipe inlets 156A-156D (as shown in FIG. 2).

With further reference to FIG. 3, in some embodiments, the coolant passage 108 of each of the exhaust runners 102 may be concentrically disposed around the exhaust conduit 106. For example, the exhaust conduit 106 of each exhaust runner 102 may extend from the inlet end 110 to the outlet end 120 along a path through the runner body 104, and the coolant passage 108 may concentrically surround the exhaust conduit 106 along the path from the inlet end 110 to the outlet end 120. Moreover, the exhaust conduit 106 may be defined within an interior wall 130 that is formed by a portion of the runner body 104. The interior wall 130 may then be surrounded by an exterior wall 132 of the runner body 104, thereby defining the coolant passage 108 between the interior wall 130 and the exterior wall 132. Accordingly, the coolant passage 108 is positioned concentrically around the exhaust conduit 106. Having the coolant passage 108 be concentrically disposed around the exhaust conduit 106 allows a large area of heat transfer between the exhaust conduit 106 and the coolant passage 108. Accordingly, such a configuration may provide more heat transfer from the exhaust within the exhaust conduit 106 to the coolant in the coolant passage 108 than a coolant passage without a concentric configuration operating under similar conditions.

In some embodiments, the coolant passage 108 of each exhaust runner 102 has an annular cross section that surrounds the exhaust conduit 106 and extends along a majority of a length of the exhaust conduit 106. In other words, in some embodiments, the coolant passage 108 completely surrounds the exhaust conduit 106 without any connection between interior wall 130 and the exterior wall 132 of the runner body. Moreover, in some embodiments, the annular cross section of the coolant passage 108 extends over substantially the entire exhaust conduit 106, except at the ends of the exhaust runner 102 around the exhaust inlet opening 114 and the exhaust outlet opening 124. In other embodiments, partitions may extend between the interior wall 130 and the exterior wall 132 such that the coolant passage 108 is not completely annular along a majority of the exhaust conduit 106. Such partitions may provide added stability or control the flow direction of any coolant running through the coolant passage 108.

In some embodiments, the coolant inlet opening 116 of the coolant passage 108 of each exhaust runner 102 may be disposed at the inlet end 110 of the exhaust runner 102 and the coolant outlet opening 126 may be disposed at the outlet end 120 of the exhaust runner 102. In such a configuration, the exhaust and the coolant will run in parallel through the exhaust runner 102. In other embodiments, the coolant inlet opening 116 of the coolant passage 108 of each exhaust runner 102 may be disposed at the outlet end 120 of the exhaust runner 102 and the coolant outlet opening 126 may be disposed at the inlet end 110 of the exhaust runner, such that the exhaust and coolant run in counter flow. Providing the coolant inlet opening 116 and the coolant outlet opening 126 at the ends of the exhaust runner 102 allows for a greater area of thermal contact between the exhaust conduit 106 and the coolant passage 108. Still, in other embodiments, due to geometric or other constraints, the coolant inlet opening 116 and/or the coolant outlet opening 126 may be disposed at another location, such as toward the center of the exhaust runner 102.

In some embodiments, the coolant inlet opening 116 is configured such that coolant flowing through the coolant inlet opening 116 flows perpendicular to the interior wall 130 that defines the exhaust conduit 106 so as to impinge upon the interior wall 130. Further, in some embodiments the coolant passage 108 is configured so as to form a swirling flow of coolant within the coolant passage 108, such that the coolant swirls around the exhaust conduit 106. These and other configurations of the flow pattern of coolant within the coolant passage 108 can assist in promoting heat transfer between the exhaust and the coolant.

Figure 4:
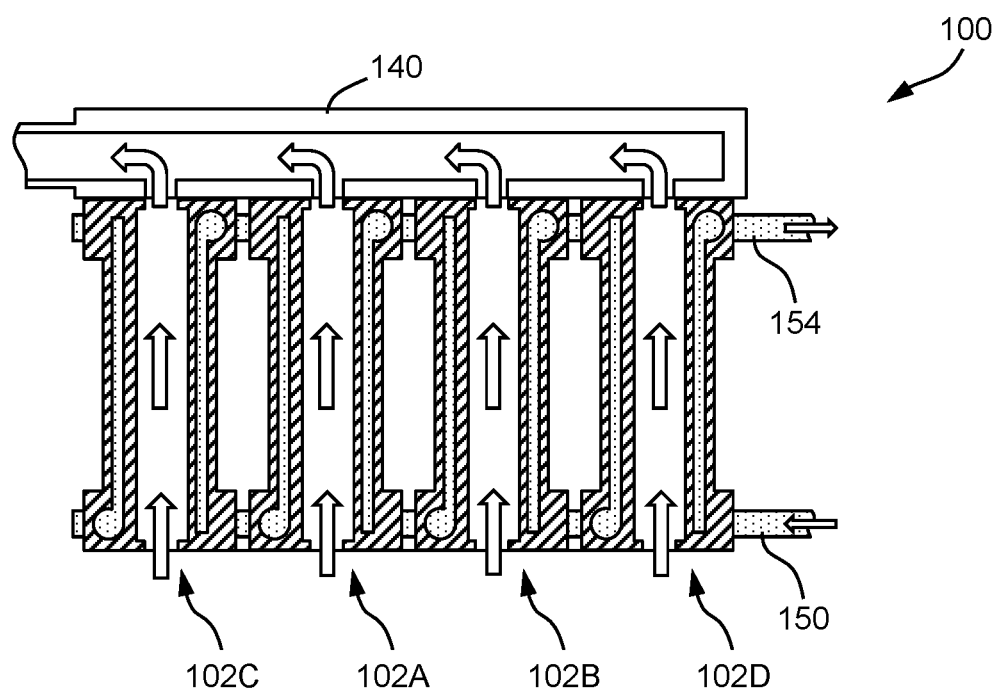
FIG. 4 is a schematic depiction of the fluid-cooled manifold according to FIG. 1.

In some embodiments, the fluid-cooled manifold includes four exhaust runners. For example, the fluid-cooled manifold 100 shown in FIG. 1 has four exhaust runners 102A-102D arranged in a row. The first exhaust runner 102A and second exhaust runner 102B are positioned toward the center of the row of exhaust runners 102A-102D, while the third exhaust runner 102C and fourth exhaust runner 102D are positioned at the ends of the row of exhaust runners 102A-102D. A schematic depiction of fluid-cooled manifold 100 is also shown in FIG. 4 for comparison to schematic depictions of other fluid-cooled manifolds discussed below. FIG. 4 illustrates the four exhaust runners 102A-102D. Each of the exhaust runners 102A-102D delivers exhaust from the engine to the exhaust collection manifold 140. As the exhaust passes through the exhaust runners 102A-102D it is cooled by the coolant that is circulated through the exhaust runners 102A-102D. Further, the coolant is received in the exhaust runners 102A-102D from a coolant feed pipe 150 that is coupled to each of the exhaust runners 102A-102D. Likewise, the coolant returns to the coolant circulation system via the coolant exit pipe 154, which is also coupled to each of the exhaust runners 102A-102D.

Figure 5:
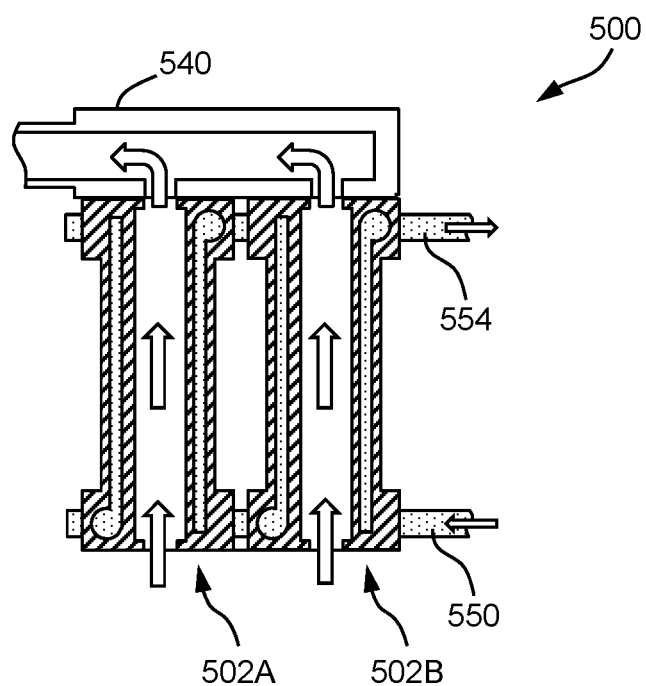
FIG. 5 is a schematic depiction of a fluid-cooled manifold according to another embodiment of the disclosure.

In other embodiments, the fluid-cooled manifold includes a different number of exhaust runners. Accordingly, such embodiments may be configured to operate with engines having a different number of exhaust ports. For example, FIG. 5 shows a schematic depiction of a fluid-cooled manifold 500 that includes only two exhaust runners, including first exhaust runner 502A and second exhaust runner 502B. Both the first exhaust runner 502A and the second exhaust runner 502B deliver exhaust from the engine to the exhaust collection manifold 540. Again, as the exhaust passes through the exhaust runners 502A-502B it is cooled by the coolant that is circulated through the exhaust runners 502A-502B. A coolant feed pipe 550 is coupled to both the first exhaust runner 502A and the second exhaust runner 502B in order to deliver coolant to both exhaust runners 502A-502B. Likewise, the coolant returns to the coolant circulation system via the coolant exit pipe 554, which is also coupled to both of the exhaust runners 502A-502B.

Figure 6:
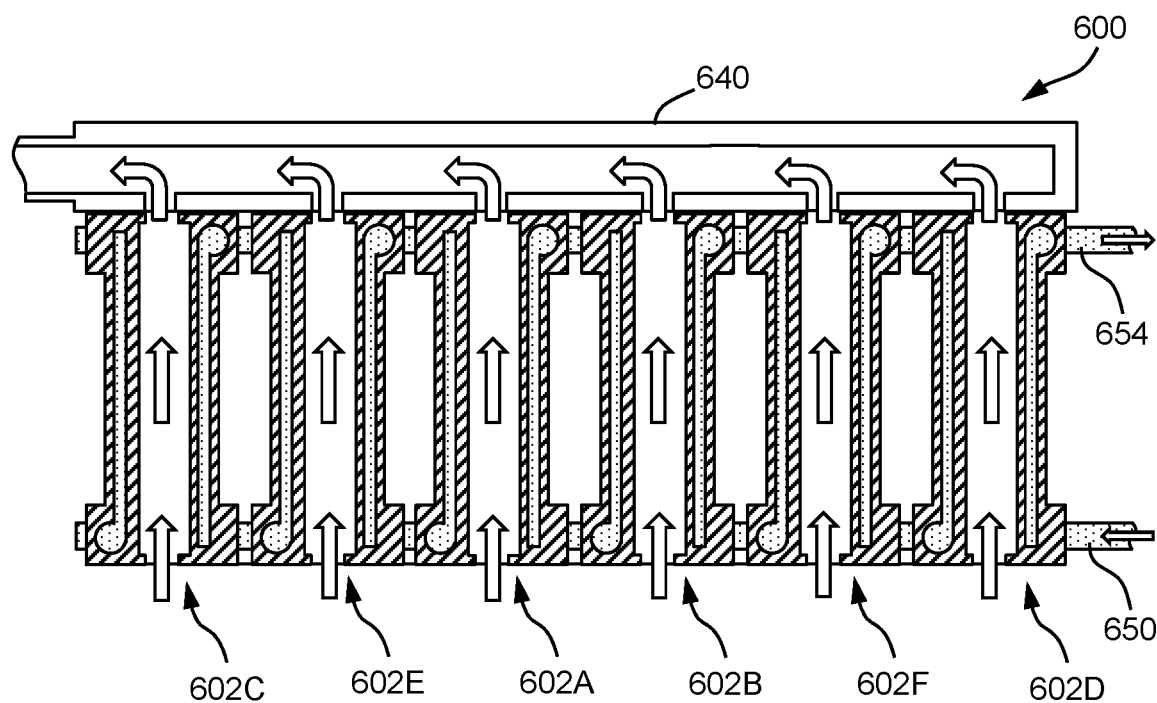
FIG. 6 is a is a schematic depiction of a fluid-cooled manifold according to another embodiment of the disclosure.

As another example, FIG. 6 shows a schematic depiction of a fluid-cooled manifold 600 that includes six exhaust runners. Similar to fluid-cooled manifold 100, fluid-cooled manifold 600 includes a first exhaust runner 602A and a second exhaust runner 602B that are located at the center of a row of exhaust runners 602A-602F. Further, a third exhaust runner 602C and a fourth exhaust runner 602D are disposed at the end of the row of exhaust runners 602A-602F. In addition, a fifth exhaust runner 602E and a sixth exhaust runner 602F are located at intermediate positions between the center and the ends of the row. Each of the exhaust runners 602A-602D delivers exhaust from the engine to the exhaust collection manifold 640. As the exhaust passes through the exhaust runners 602A-602D it is cooled by coolant being circulated through the exhaust runners 602A-602F. Further, the coolant is received in the exhaust runners 602A-602F from a coolant feed pipe 650 that is coupled to each of the exhaust runners 602A-602F. Likewise, the coolant returns to the coolant circulation system via the coolant exit pipe 654, which is coupled to each of the exhaust runners 602A-602F.

In some embodiments, the first exhaust runner is detached from the second exhaust runner. For example, in each of the embodiments of the fluid-cooled manifold 100, 500, 600 shown in FIGS. 1-6, the first exhaust runner 102A, 502A, 602A is detached from the respective second exhaust runner 102B, 502B, 602B. The term "detached," as used herein, refers to a situation where two components are neither directly coupled to one another, nor part of a larger construction formed as a single integral piece. Thus, the detached first and second exhaust runners, e.g., 102A, 102B, are neither directly coupled to one another, nor are they part of a larger construction that includes the exhaust runners, e.g., 102A, 102B, in a single integral piece. Further, in some embodiments, the detached exhaust runners are separated from one another by a space. In other embodiments, the detached exhaust runners may abut one another while not being directly coupled to one another.

In some embodiments, each of the exhaust runners 102A-102D is detached from all of the other exhaust runners 102A-102D of the fluid-cooled manifold 100. For example, in fluid-cooled manifold 100, exhaust runners 102A-102D are arranged in a row, but none of the exhaust runners 102A-102D are attached to one another. In contrast, each exhaust runner 102A-102D is detached from the others. Instead, the exhaust runners 102A-102D are connected to one another via their attachment to the exhaust collection manifold 140, coolant feed pipe 150 and coolant exit pipe 154.

The use of exhaust runners 102A-102D that are detached from one another allows the portion of the fluid-cooled manifold 100 that includes two different fluid paths, i.e., the exhaust runners 102A-102D that include both the exhaust conduit 106 and the coolant passage 108, to be manufactured as a group of smaller individual components. Including separate passages that accommodate different fluids within the body of a manifold is complicated. Further, providing a single large manifold with various passages for different exhaust streams as well as additional passages for coolant channels that cool the exhaust streams would add considerable complexity. By designing the manifold as several different components, including individual and detached exhaust runners that each include a single exhaust conduit 106, the manufacturing can be simplified.

Figure 7:
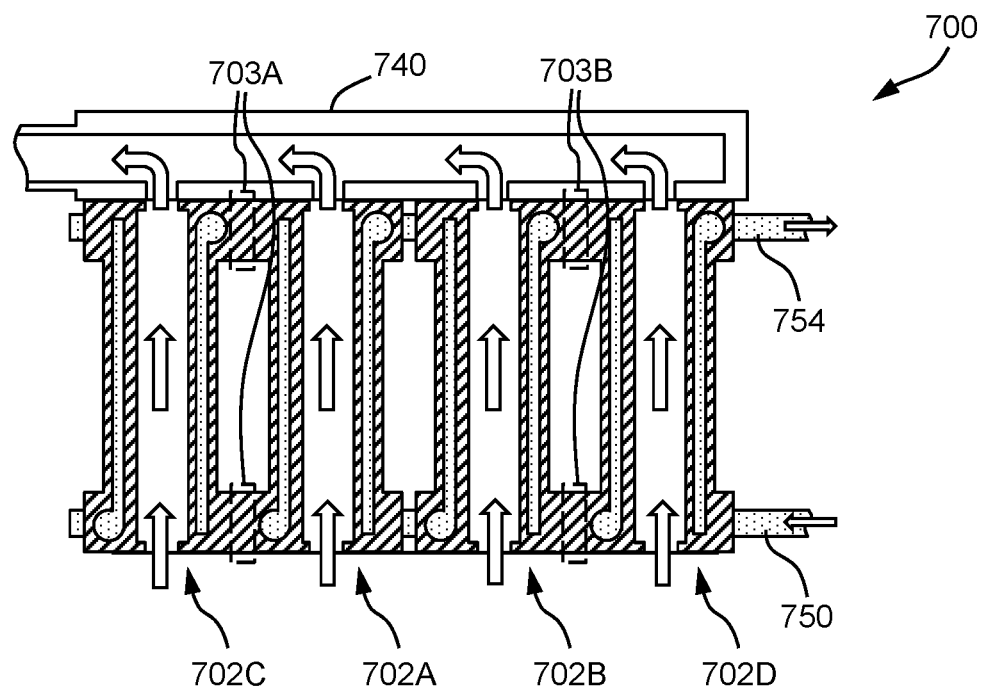
FIG. 7 is a schematic depiction of a fluid-cooled manifold according to another embodiment of the disclosure.

In other embodiments, at least some of the exhaust runners are attached to one another. For example, FIG. 7 depicts an embodiment of a fluid-cooled manifold 700 that includes four exhaust runners 702A-702D arranged in a row, similar to the fluid-cooled manifold 100 shown in FIG. 1. The first exhaust runner 702A and second exhaust runner 702B are positioned toward the center of the row, while the third exhaust runner 702C and fourth exhaust runner 702D are positioned at the ends of the row. As with the previously described embodiments, each of the exhaust runners 702A-702D delivers exhaust from the engine to the exhaust collection manifold 740, receives coolant from a coolant feed pipe 750 and returns the coolant to a coolant exit pipe 754. Similar to the other embodiments, the first exhaust runner 702A is detached from the second exhaust runner 702B. However, the first exhaust runner 702A is attached to third exhaust runner 702C, as identified in regions 703A. In particular, the first exhaust runner 702A is attached to third exhaust runner 702C at the inlet end and at the outlet end. For example, the first exhaust runner 702A may be formed in a single integral piece with the third exhaust runner 702C. The second exhaust runner 702B may also be attached to the fourth exhaust runner 702D, as identified in regions 703B. For example, the second exhaust runner 702B may be formed in a single integral piece with the fourth exhaust runner 702D, as shown in FIG. 7. In some embodiments, the exhaust runners are attached to one another in pairs, allowing a fluid-cooled manifold to be constructed with any even number of exhaust runners.

In contrast to the embodiment of FIG. 1, where all of the exhaust runners 102A-102D are detached from one another, and the embodiment of FIG. 7, where some of the exhaust runners 702A-702D are attached to one another, in other embodiments, all of the exhaust runners are attached to one another. For example, in some embodiments, all of the exhaust runners of the fluid-cooled manifold are formed in a single integral piece.

In some embodiments, the exhaust runners 102A-102D have a similar configuration. For example, in some embodiments, the height and width of each of the exhaust runners 102A-102D may be the same. Likewise, in some embodiments, the length of the exhaust conduit 106 and/or the length of the coolant passage 108 of each of the exhaust runners 102A-102D may be the same. Further, in some embodiments, each of the exhaust runners 102A-102D may have the same shape. For example, each of exhaust runners 102A-102D in fluid-cooled manifold 100, shown in FIGS. 1 and 2 have the same shape. Two components that have the "same shape," as the phrase is used herein, refers to components that are manufactured using the same method or tools, such that the components are interchangeable. For example, two components having the same shape may be molded or cast in the same die. Differences between components having the same shape may be based on manufacturing tolerances or variations caused by installation.

The use of exhaust runners 102A-102D that have the same shape simplifies manufacturing, as a smaller, less complicated component can be reproduced several times to form a substantial portion of the fluid-cooled manifold 100. Moreover, in fluid-cooled manifolds where each of the exhaust runners has the same shape, the fluid-cooled manifold can be redesigned by adding or removing one or more exhaust runner. Accordingly, accommodating engines with different numbers of cylinders can be achieved without redesigning the entire manifold.

Although there are advantages in having each exhaust runner have the same shape, in some embodiments, the exhaust runners 102A-102D may have different configurations and different shapes. For example, in some embodiments, the exhaust runners 102A-102D may bend at different angles, or have bends with different radiuses of curvature. Other aspects of the shape and configuration of the exhaust runners 102A-102D may also differ. Differences in the geometries of the exhaust runners may be beneficial to meet space constraints or for other reasons.

In some embodiments, each exhaust runner 102 has a symmetrical configuration and is substantially symmetrical about a central plane of the exhaust runner. For example, the exhaust conduit 106 may follow the central plane of the exhaust runner 102 and be surrounded by the coolant passage 108 on both sides of the central plane. Further, in some embodiments, both the coolant inlet opening 116 and the coolant outlet opening 126 may be positioned on the central plane of the exhaust runner 102. By providing the exhaust runners 102A-102D with a symmetrical configuration, the exhaust runners 102A-102D may operate independently of the overall orientation and position of the fluid-cooled manifold with respect to the engine. Thus, the exhaust runners 102A-102D can be implemented in a fluid-cooled manifold 100 configured to couple to the right side of an engine, or the same exhaust runners 102A-102D can be implemented in a fluid-cooled manifold 100 configured to couple to the left side of an engine.

In some embodiments, the central plane of each of the exhaust runners 102A-102D may be parallel within the fluid-cooled manifold 100. By providing the exhaust runners 102A-102D with a parallel alignment throughout the fluid-cooled manifold 100, the size of the fluid-cooled manifold 100 can be modified to cooperate with engines having more or fewer cylinders simply by adding or removing exhaust runners. The relative position or angle of one exhaust runner does not need to be modified with respect to neighboring exhaust runners as the number of exhaust runners changes, since the respective orientation is always parallel.

In some embodiments, the coolant feed pipe 150 and the coolant exit pipe 154 may have the same shape. Such a configuration simplifies manufacture of the fluid-cooled manifold 100, since both the coolant feed pipe 150 and the coolant exit pipe 154 can be formed by the same part, similar to the various exhaust runners 102A-102D.

The above-described components of the fluid-cooled manifold 100 may be composed of a variety of different materials. For example, the components may be formed of metal, such as steel or aluminum. Likewise the above-described components may be formed of a plastic material. Further, in some embodiments, different components are formed of different materials. For example, in some embodiments, the exhaust runners 102A-102D may be formed of steel, while the coolant feed pipe 150 and the coolant exit pipe 154 are formed of plastic. The fluid-cooled manifold 100 may include additional components to those that have been described, such as fasteners, seals, sensors or any other components that may be advantageous.

The fluid-cooled manifold 100 may be manufactured using a variety of different methods. For example, the exhaust runners 102 may be molded or cast. Likewise, the exhaust collection manifold 140, coolant feed pipe 150, and coolant exit pipe 154 may also be molded or cast. Further, each of these components can be machined from a block of material, or manufactured by an additive manufacturing process. Other methods of manufacture are also possible.

Figure 8:
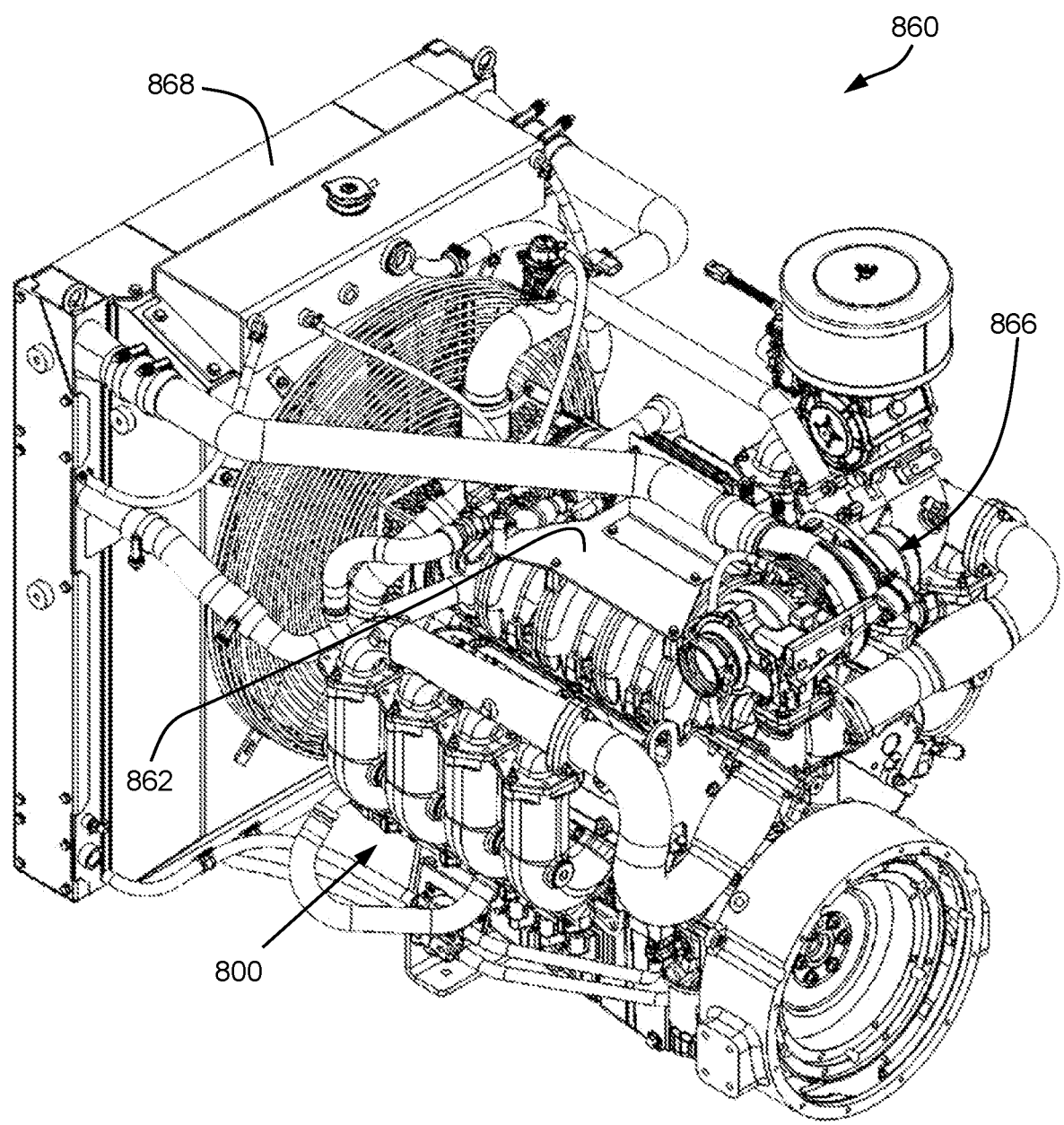
FIG. 8 is a perspective view of an engine system according to an embodiment of the disclosure.
Figure 9:
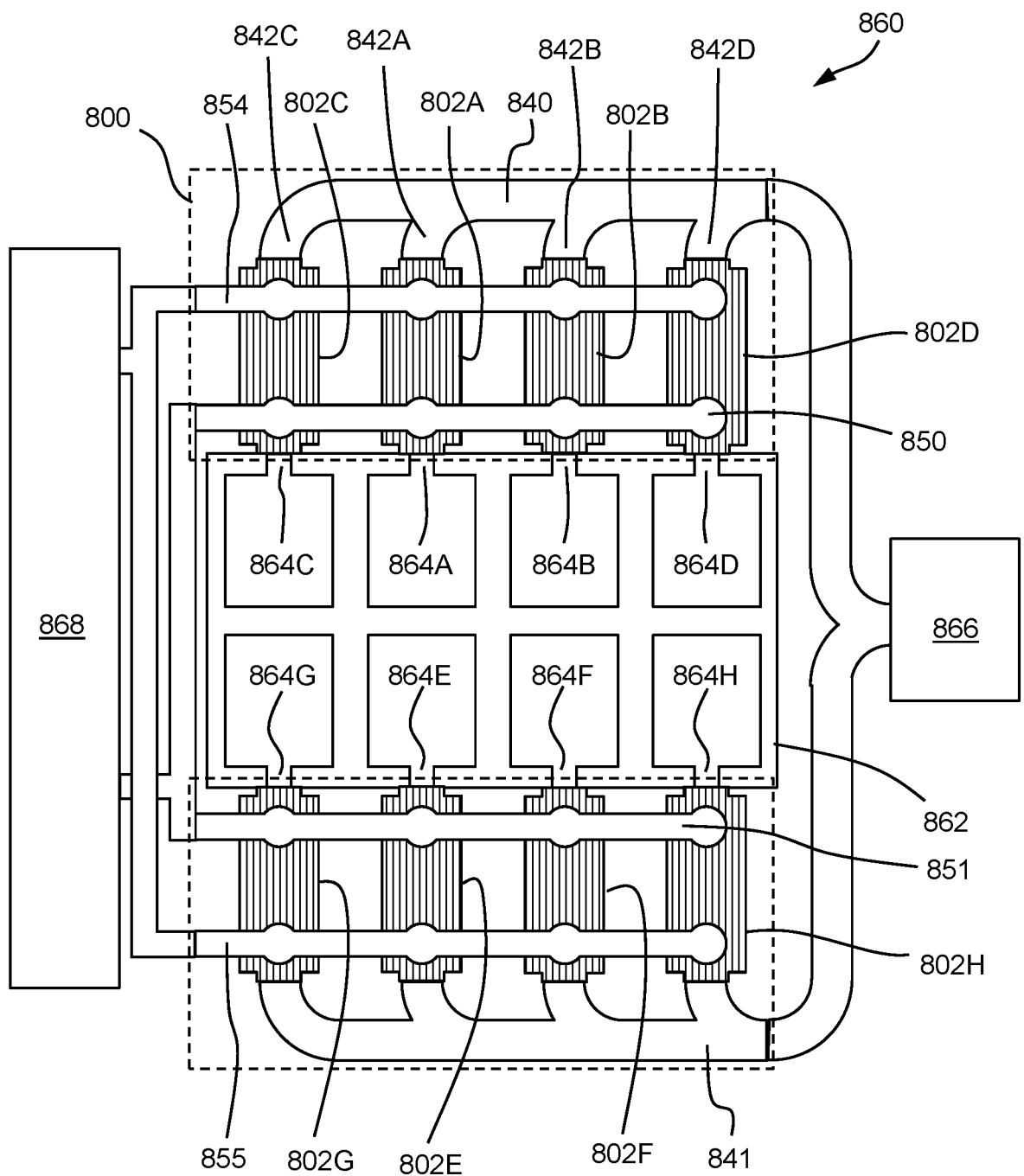
FIG. 9 is a schematic depiction of the engine system according to FIG. 8.

In another aspect, the disclosure provides an engine system. FIG. 8 illustrates an engine system 860 according to an embodiment of the disclosure. The engine system 860 may include an engine 862, at least one fluid-cooled manifold 800, a turbocharger 866, and a radiator 868. A schematic depiction of the engine system 860 is shown in FIG. 9 to illustrate various features of the depicted embodiment. Engine system 860, as shown in FIG. 9, includes an engine 862 that may include a plurality of exhaust ports 864A-864H, including a first group of exhaust ports 864A-864D. A first fluid-cooled manifold 800 may be coupled to the engine 862 and configured to receive exhaust from the first group of exhaust ports 864A-864D. The first fluid-cooled manifold 800 may be configured according to any of the above-described embodiments. For example, the first fluid-cooled manifold 800 may include a first group of exhaust runners 802A-802D that are detached from one another. Each of the first group of exhaust runners 802A-802D of the first fluid-cooled manifold 800 may be coupled to a respective one of the first group of exhaust ports 864A-864D of the engine 862.

The first fluid-cooled manifold 800 may also include an exhaust collection manifold 840 including a plurality of inlets 842A-842D, where each inlet 842A-842D of the exhaust collection manifold 840 is coupled to an exhaust outlet opening of a respective one of the first group of exhaust runners 802A-802D. The first fluid-cooled manifold 800 may also include a coolant feed pipe 850 and a coolant exit pipe 854. As described above with respect to various embodiments of the fluid-cooled manifold, the coolant feed pipe 850 may be configured to supply coolant to the first group of exhaust runners 802A-802D and the coolant exit pipe 854 may be configured to receive coolant from the first group of exhaust runners 802A-802D.

In some embodiments of the engine system 860, the engine 862 includes a second group of exhaust ports 864E-864H. A second fluid-cooled manifold 801 may be coupled to the engine 862 and configured to receive exhaust from the second group of exhaust ports 864E-864H. The second fluid-cooled manifold 801 may be configured according to any of the above-described embodiments. For example, each of the second group of exhaust runners 802E-802H of the second fluid-cooled manifold 801 may be coupled to a respective one of the second group of exhaust ports 864E-864H of the engine 862. Further, the second fluid-cooled manifold 801 may also include an exhaust collection manifold 841 including a plurality of inlets 843A-843D, where each inlet 843A-843D of the exhaust collection manifold 841 is coupled to an exhaust outlet opening of a respective one of the second group of exhaust runners 802E-802H. The second fluid-cooled manifold 800 may also include a coolant feed pipe 851 and a coolant exit pipe 855. As described above with respect to various embodiments of the fluid-cooled manifold, the coolant feed pipe 851 may be configured to supply coolant to the second group of exhaust runners 802E-802H and the coolant exit pipe 855 may be configured to receive coolant from the first group of exhaust runners 802E-802H. A second fluid-cooled manifold 801 may be particularly useful where the exhaust ports 864A-864H of the engine 862 are disposed in two groups, for example in a V8 engine, where the exhaust ports 864A-864H are disposed on either side of the engine 862.

In some embodiments of the engine system, each of the exhaust runners 802A-802H of both the first group and the second group has the same configuration. Accordingly, the first fluid-cooled manifold 800 and the second fluid-cooled manifold 801 may be formed from eight exhaust runners 802 that are all manufactured as the same part. Likewise, in some embodiments the exhaust collection manifold 840 of the first fluid-cooled manifold 800 and the exhaust collection manifold 841 of the second fluid-cooled manifold 801 may be have the same shape and be manufactured as the same part. Further, in some embodiments, the coolant feed pipe 850 of the first fluid-cooled manifold 800 and the coolant feed pipe 851 of the second fluid-cooled manifold 801 may have the same shape and be manufactured as the same part. Similarly, in some embodiments, the coolant exit pipe 854 of the first fluid-cooled manifold 800 and the coolant feed pipe 851 of the second fluid-cooled manifold 801 may also have the same shape and be manufactured as the same part. Indeed, in some embodiments, each of the coolant feed pipe 850 of the first fluid-cooled manifold 800, the coolant feed pipe 851 of the second fluid-cooled manifold 801, the coolant exit pipe 854 of the first fluid-cooled manifold 800, and the coolant feed pipe 851 of the second fluid-cooled manifold 801, may have all the same shape and be manufactured as the same part. The similarity of the shape of these components and the ability to use the same part in both manifolds and/or as more than one component of both manifolds simplifies manufacturing, as the overall list of components is reduced and the complexity of each part is also reduced. Rather than a system having more unique components, or larger more complex components, the system can be fabricated from the reuse of several smaller, simpler components.

In some embodiments, the engine system 860 may include a turbocharger 866, where the first fluid-cooled manifold 800 is coupled to the turbocharger 866 and is configured to deliver cooled exhaust to the turbocharger 866. By cooling the exhaust prior to delivering the exhaust to the turbocharger 866, the engine 862 may be run at higher power loads. In contrast, if the exhaust is delivered directly to the turbocharger 866 when the engine 862 is operating at high loads, the exhaust temperature may be high enough to damage components of the turbocharger 866. For example, in some instances, when an engine 862 is operated with a turbocharger 866 at high loads, the exhaust temperature may be higher than 700° C. Many materials commonly used in turbochargers cannot withstand such high temperatures and will begin to crack or melt. Reducing the temperature of the exhaust allows the engine to continue running at high loads without damaging the engine or turbocharger.

In some embodiments, the fluid-cooled manifolds 800, 801 may reduce the temperature of the exhaust by more than 100° C. Such a decrease in temperature can allow the engine to be run at high power output without damaging the turbocharger. As an example, an 8.8 L V8 engine operated while using a turbocharger and a pair of the fluid-cooled manifolds of the disclosure can be operated at over 200 kW without damaging the turbocharger.

In some embodiments, the engine system 860 may include a radiator 868. The radiator 868 can be used to reduce the temperature of the coolant coming from the exhaust runners 802A-802H and allow lower temperature coolant to be recirculated back to the exhaust runners 802A-802H. The lower temperature of the coolant allows the coolant to remove a greater amount of energy from the exhaust within the fluid-cooled manifolds 800, 801.

Figure 10:
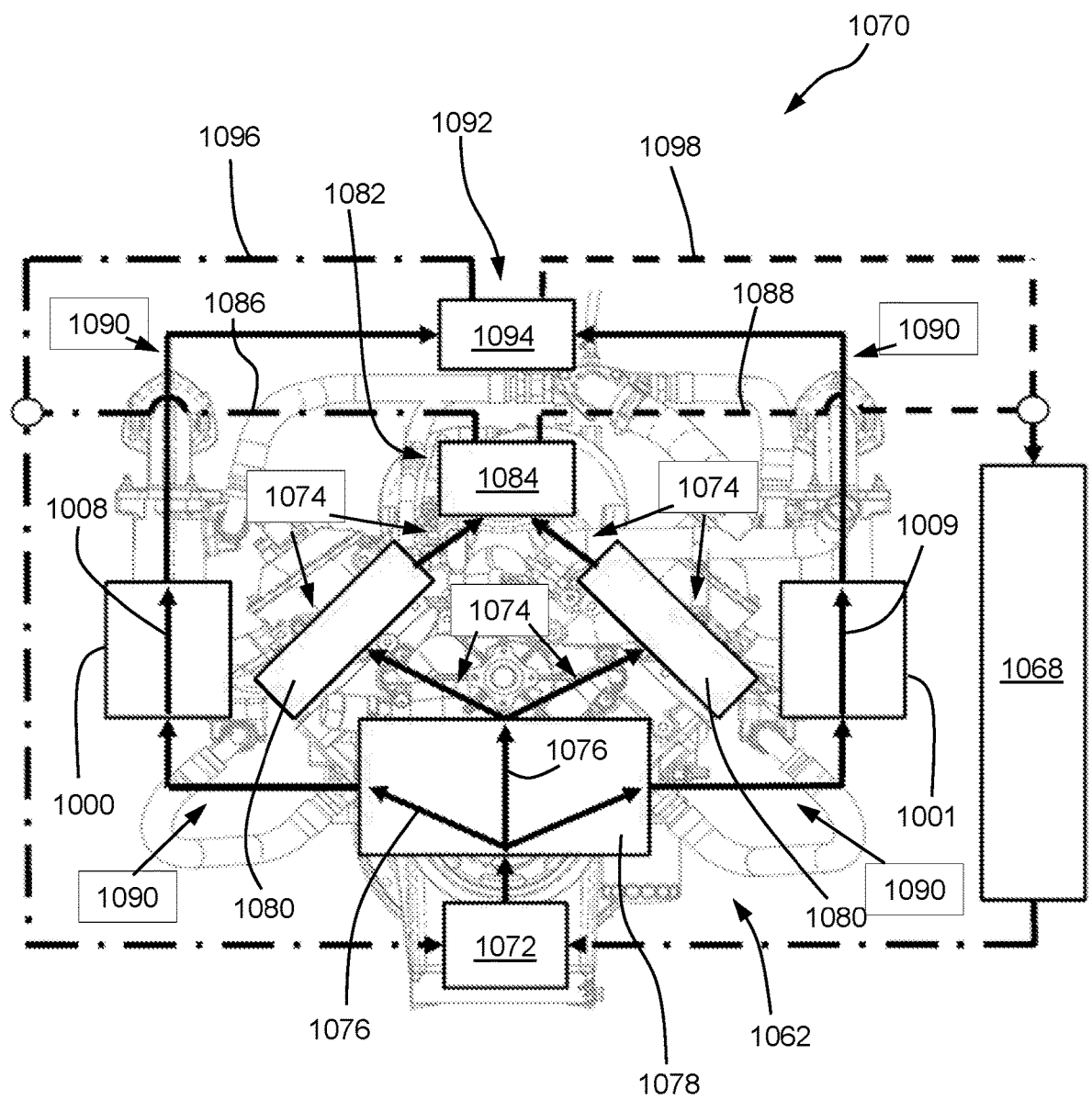
FIG. 10 is a schematic depiction of a coolant circulation system according to another embodiment of the disclosure.

In another aspect, the disclosure provides a coolant circulation system for an engine. FIG. 10 illustrates a schematic depiction of a coolant circulation system 1070 according to an embodiment of the disclosure. The coolant circulation system 1070 may include a pump 1072 configured to circulate coolant through the coolant circulation system 1070. The coolant circulation system 1070 may also include a first cooling line 1074 that is in fluid communication with the pump 1072. The first cooling line 1074 may include engine coolant passages 1076 extending through a portion of an engine 1062, such as the engine block 1078 and the engine head 1080. The first cooling line 1074 may lead to a first junction 1082 where a first thermostat 1084 is disposed. The first thermostat 1084 may be configured to direct a portion of flow from the first cooling line 1074 to a first cold return line 1086 or a first hot return line 1088. The first cold return line 1086 may extend from the first junction 1082 back to the pump 1072. On the other hand, the first hot return line 1088 may extend from the first junction 1082 through a heat exchanger 1068, such as a radiator, that is configured to cool the coolant in the first hot return line 1088.

The first thermostat 1084 allows the coolant to continue circulating through the engine coolant passages 1076 and returning to the pump 1072 without passing through the heat exchanger 1068 until the coolant reaches a predetermined temperature. Once the coolant temperature is at or above the predetermined temperature at the first thermostat 1084, the first thermostat 1084 will route at least a portion of the coolant through the heat exchanger 1068 before it is returned to the pump 1072 and engine 1062.

The coolant circulation system 1070 may also include a second cooling line 1090 that is in fluid communication with the pump 1072 and includes manifold coolant passages 1008 extending through a first cooled exhaust manifold 1000. The second cooling line 1090 may lead to a second junction 1092 where a second thermostat 1094 is disposed. The second thermostat 1094 may be configured to direct a portion of flow from the second cooling line 1090 to a second cold return line 1096 or a second hot return line 1098. The second cold return line 1086 may extend from the second junction 1092 back to the pump 1072. On the other hand, the second hot return line 1098 may extend from the second junction 1092 through the heat exchanger 1068 that is configured to cool the coolant in the second hot return line 1098.

Similar to the first thermostat 1084, the second thermostat 1094 allows the coolant to continue circulating through the manifold coolant passages 1008 and returning to the pump 1072 without passing through the heat exchanger 1068 until the coolant reaches a predetermined temperature. Once the coolant temperature is at or above the predetermined temperature at the second thermostat 1094, the second thermostat 1094 will route at least a portion of the coolant through the heat exchanger 1068 before it is returned to the pump 1072 and the manifold coolant passages 1008.

The coolant can be any of a number of heat transfer fluids configured to circulate through the coolant circulation system and cool the exhaust. In embodiments, the coolant may be a liquid, a gas, or a two-phase flow. In some embodiments the coolant includes water. Further, in some embodiments, the coolant may include additives, such as anti-corrosion additives and anti-freeze additives.

In some embodiments of the coolant circulation system 1070, the second cooling line 1090 may include engine coolant passages 1076 in addition to the manifold coolant passages 1008. For example, the second cooling line 1090 may include passages through the engine block 1078 before the second cooling line 1090 branches off to the manifold coolant passages 1008 through the fluid-cooled manifold 1000.

In some embodiments of the coolant circulation system 1070, the first cooling line 1074 may have a first portion that includes the manifold coolant passages 1008 extending through the first fluid-cooled manifold 1000. Further, the first cooling line 1080 may also include a second portion that includes manifold coolant passages 1009 extending through the second fluid-cooled manifold 1001. The first portion of the first cooling line 1080 may run parallel to the second portion of the first cooling line 1080.

In some embodiments, the coolant circulation system 1070 may include an orifice downstream of the fluid-cooled manifold(s). The orifice may be configured to avoid diverting too much coolant from the engine and to increase coolant pressure in the fluid-cooled manifolds. Due to the higher coolant pressure, the boiling temperature of the coolant may be increased, such that phase change of the coolant is reduced and heat transfer to the coolant is enhanced.

Examples given above are merely illustrative and are not meant to be an exhaustive list of all possible embodiments, applications or modifications of the invention. Thus, various modifications and variations of the described apparatus and systems will be apparent to those skilled in the art without departing from the scope and spirit of the disclosure. Although the disclosure has been described in connection with specific embodiments, it should be understood that the claims should not be unduly limited to such specific embodiments.

The terminology used herein is used for the purpose of describing particular embodiments only, and is not intended to limit the scope of the invention. It also is to be noted that, as used herein and in the appended claims, the singular forms "a," "an," and "the" include the plural reference unless the context clearly dictates otherwise. Thus, for example, a reference to "an exhaust runner" is a reference to one or more exhaust runners and equivalents thereof known to those skilled in the art.

Unless defined otherwise, all technical and scientific terms used herein have the same meanings as commonly understood by one of ordinary skill in the art to which the invention pertains. It should be noted that the features illustrated in the drawings are not necessarily drawn to scale, and features of one embodiment may be employed with other embodiments as the skilled artisan would recognize, even if not explicitly stated herein.

Any numerical values recited herein include all values from the lower value to the upper value in increments of one unit provided that there is a separation of at least two units between any lower value and any higher value. As an example, if it is stated that the concentration of a component or value of a process variable such as, for example, size, angle size, pressure, time and the like, is, for example, from 1 to 90, specifically from 20 to 80, more specifically from 30 to 70, it is intended that values such as 15 to 85, 22 to 68, 43 to 51, 30 to 32, etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Particular apparatus, systems, and components are described, although any apparatus, systems, and components similar or equivalent to those described herein can be used in the practice of the claims.

The invention claimed is:

1. A fluid-cooled manifold for cooling exhaust from an engine, the cooled manifold comprising:
 a plurality of exhaust runners including a first exhaust runner and a second exhaust runner, wherein the first exhaust runner is detached from the second exhaust runner, each of the plurality of exhaust runners comprising:
 a runner body having an inlet end and an outlet end, an exhaust conduit extending through the runner body from an exhaust inlet opening at the inlet end of the runner body to an exhaust outlet opening at the outlet end of the runner body, and a coolant passage extending through the runner body from a coolant inlet opening to a coolant outlet opening;

an exhaust collection manifold including a plurality of inlets, wherein each inlet of the exhaust collection manifold is coupled to the exhaust outlet opening of a respective one of the plurality of exhaust runners;

a coolant feed pipe including a plurality of outlets, wherein each outlet of the coolant feed pipe is coupled to the coolant inlet of a respective one of the plurality of exhaust runners; and a coolant exit pipe including a plurality of inlets, wherein each inlet of the coolant exit pipe is coupled to the coolant outlet of a respective one of the plurality of exhaust runners.

2. The fluid-cooled manifold according to claim 1, wherein for each exhaust runner of the plurality of exhaust runners, the coolant inlet opening is disposed at the inlet end of the exhaust runner and the coolant outlet opening is disposed at the outlet end of the exhaust runner.

3. The fluid-cooled manifold according to claim 1, wherein for each exhaust runner of the plurality of exhaust runners, the coolant inlet opening is disposed at the outlet end of the exhaust runner and the coolant outlet opening is disposed at the inlet end of the exhaust runner.

4. The fluid-cooled manifold according to claim 1, wherein each exhaust runner of the plurality of exhaust runners has the same shape as the other exhaust runners of the plurality of exhaust runners.

5. The fluid-cooled manifold according to claim 1, wherein the coolant feed pipe and the coolant exit pipe have the same shape.

6. The fluid-cooled manifold according to claim 1, wherein for each exhaust runner of the plurality of exhaust runners, the coolant passage is concentrically disposed around the exhaust conduit.

7. The fluid-cooled manifold according to claim 6, wherein for each exhaust runner of the plurality of exhaust runners, the coolant passage has an annular cross section that surrounds the exhaust conduit and that extends along a majority of a length the exhaust conduit.

8. The fluid-cooled manifold according to claim 1, wherein the plurality of exhaust runners includes a third exhaust runner and a fourth exhaust runner.

9. The fluid-cooled manifold according to claim 8, wherein each exhaust runner of the plurality of exhaust runners is detached from the other exhaust runners of the plurality of exhaust runners.

10. An engine system comprising:

an engine comprising a plurality of exhaust ports including a first group of exhaust ports; and a first fluid-cooled manifold coupled to the engine and configured to receive exhaust from the first group of exhaust ports, the first fluid-cooled manifold comprising:

a first group of exhaust runners including a first exhaust runner and a second exhaust runner, wherein the first exhaust runner is detached from the second exhaust runner, each of the first group of exhaust runners comprising:

a runner body having an inlet end and an outlet end, an exhaust conduit extending through the runner body from an exhaust inlet opening at the inlet end of the runner body to an exhaust outlet opening at the outlet end of the runner body, wherein the exhaust inlet is coupled to a respective exhaust port of the first group of exhaust ports, and a coolant passage extending through the runner body from a coolant inlet opening to a coolant outlet opening, an exhaust collection manifold including a plurality of inlets, wherein each inlet of the exhaust collection manifold is coupled to the exhaust outlet opening of a respective one of the first group of exhaust runners, a coolant feed pipe including a plurality of outlets, wherein each outlet of the coolant feed pipe is coupled to the coolant inlet of a respective one of the first group of exhaust runners, and a coolant exit pipe including a plurality of inlets, wherein each inlet of the coolant exit pipe is coupled to the coolant outlet of a respective one of the first group of exhaust runners.

11. The engine system according to claim 10, wherein the plurality of exhaust ports of the engine further includes a second group of exhaust ports, and wherein the engine system further comprises a second fluid-cooled manifold including a second group of exhaust runners, each exhaust runner of the second group of exhaust runners including an exhaust inlet coupled to a respective exhaust port of the second group of exhaust ports.

12. The engine system according to claim 10, wherein for each exhaust runner of the first group of exhaust runners, the coolant passage is concentrically disposed around the exhaust passage.

13. The engine system according to claim 12, wherein for each exhaust runner of the first group of exhaust runners, the coolant passage has an annular cross section that surrounds the exhaust passage and that extends along a majority of the exhaust passage.

14. The engine system according to claim 10 further comprising a turbocharger, wherein the first fluid-cooled manifold is coupled to the turbocharger and is configured to deliver cooled exhaust to the turbocharger.

15. The engine system according to claim 11, wherein each of the exhaust runners of the first group of exhaust runners and the second group of exhaust runners has the same shape.

* * * * *